United States Patent
Ono et al.

(10) Patent No.: US 11,603,457 B2
(45) Date of Patent: Mar. 14, 2023

(54) CURABLE COMPOSITION, CURED PRODUCT, AND LENS UNIT

(71) Applicant: FUJIFILM Corporation, Tokyo (JP)

(72) Inventors: Masashi Ono, Kanagawa (JP); Masahiro Takata, Kanagawa (JP); Takeharu Tani, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 76 days.

(21) Appl. No.: 16/777,160

(22) Filed: Jan. 30, 2020

(65) Prior Publication Data

US 2020/0165438 A1 May 28, 2020

Related U.S. Application Data (63) Continuation of application No. PCT/JP2018/030145, filed on Aug. 10, 2018.

(30) Foreign Application Priority Data

Sep. 5, 2017 (JP) .............................. JP2017-170538

(51) Int. Cl.
*C08L 33/10* (2006.01)
*C08F 2/50* (2006.01)
(Continued)

(52) U.S. Cl.
CPC ................ *C08L 33/10* (2013.01); *C08F 2/50* (2013.01); *C08F 20/06* (2013.01); *C08K 5/57* (2013.01); *C08K 2201/003* (2013.01)

(58) Field of Classification Search
CPC ..................................................... C08L 33/10
See application file for complete search history.

(56) References Cited

U.S. PATENT DOCUMENTS

| 2009/0190224 A1* | 7/2009 | Iwasa | G02B 5/1852 359/576 |
| 2011/0090566 A1* | 4/2011 | Ukuda | G02B 1/04 359/576 |

(Continued)

FOREIGN PATENT DOCUMENTS

| CN | 1074919 A | 8/1993 |
| CN | 104603209 A | 5/2015 |

(Continued)

OTHER PUBLICATIONS

An Office Action; "Notice of Reasons for Refusal," Issued by the Japanese Patent Office dated May 26, 2020, which corresponds to Japanese Patent Application No. 2019-540848 and is related to U.S. Appl. No. 16/777,160; with English language translation.

(Continued)

*Primary Examiner* — Michael F Pepitone
(74) *Attorney, Agent, or Firm* — Studebaker & Brackett PC (57) ABSTRACT

Provided is a curable composition including oxide particles that include at least indium and tin, and to which a ligand having a hydrocarbon group and a binding site to the oxide particles is bonded; and a polymerizable compound, in which a content of the oxide particles in the composition is 18 mass % or more with respect to a total solid content of the composition; and a cured product of the curable composition or a lens unit including the cured product.

10 Claims, 2 Drawing Sheets

(51) Int. Cl.
  *C08F 20/06* (2006.01)
  *C08K 5/57* (2006.01)

(56) References Cited

U.S. PATENT DOCUMENTS

| | | | |
|---|---|---|---|
| 2015/0166780 A1 | 6/2015 | Arayama et al. | |
| 2015/0166783 A1 | 6/2015 | Arayama et al. | |
| 2015/0166816 A1 | 6/2015 | Arayama et al. | |
| 2015/0259217 A1* | 9/2015 | Ito | C01G 9/02 428/403 |

FOREIGN PATENT DOCUMENTS

| | | |
|---|---|---|
| CN | 104603210 A | 5/2015 |
| CN | 104640932 A | 5/2015 |
| JP | 2006-276195 A | 10/2006 |
| JP | 2009-197217 A | 9/2009 |
| JP | 2011-065966 A | 3/2011 |
| JP | 2011-085869 A | 4/2011 |
| JP | 2011-237491 A | 11/2011 |
| JP | 2012-220711 A | 11/2012 |
| JP | 2016-003319 A | 1/2016 |
| JP | 2017-097051 A | 6/2017 |
| WO | 93/15158 A1 | 8/1993 |
| WO | 2012/137452 A1 | 10/2012 |

OTHER PUBLICATIONS

International Search Report issued in PCT/JP2018/030145; dated Oct. 23, 2018.
Written Opinion of the ISA issued in PCTIJP2018/030145; dated Oct. 23, 2018.
Written Opinion of the IPEA issued in PCT/JP2018/030145; dated Jul. 2, 2019.
International Preliminary Report on Patentability issued in PCT/JP2018/030145; completed Nov. 6, 2019.
An Office Action mailed by the German Patent Office dated Dec. 23, 2020, which corresponds to German Patent Application No. 112018004743.1 and is related to U.S. Appl. No. 16/777,160; with English language translation.
An Office Action mailed by China National Intellectual Property Administration dated Jul. 19, 2021, which corresponds to Chinese Application No. 201880051402.0 and is related to U.S. Appl. No. 16/777,160; with English language translation.

* cited by examiner

CURABLE COMPOSITION, CURED PRODUCT, AND LENS UNIT

CROSS-REFERENCE TO RELATED APPLICATIONS

This application is a continuation application of International Application No. PCT/JP2018/030145, filed Aug. 10, 2018, which was published under PCT Article 21(2) in Japanese, and which claims priority from Japanese Patent Application No. 2017-170538, filed Sep. 5, 2017. The above application is hereby expressly incorporated by reference, in its entirety, into the present specification.

BACKGROUND OF THE INVENTION

1. Field of the Invention

The present disclosure relates to a curable composition, a cured product, and a lens unit.

2. Description of the Related Art

A diffraction grating lens is known as a high-performance lens capable of greatly reducing chromatic aberration.

As examples of materials constituting a diffraction grating lens, a resin having a relatively high refractive index and a large Abbe number, and a resin having a relatively low refractive index and a small Abbe number are known.

For example, JP2011-237491A discloses an energy curable resin composition characterized by including an organic component (A) containing one or more fluorine-based monomers having a polymerizable functional group in a molecule, and one or more acrylic monomers having two or more polymerizable functional groups in a molecule; a transparent conductive metal oxide fine particle (B); and an energy curable resin composition (C) containing a polymerization initiator, in which a content of the organic component (A) is 40 wt % to 68 wt %, and a content of the acrylic monomer contained in the organic component is 1.3 wt % to 5.0 wt % with respect to the organic component.

JP2011-085869A discloses an optical material including a cured product composed of at least an indium tin oxide (ITO) fine particle and of a resin composition containing an optical resin, in which the optical material has a minimum value of a refractive index in a wavelength range of 1600 nm to 1800 nm (a value satisfying a relationship of $dn/d\lambda=0$ and $d^2n/d\lambda^2>0$, where, n: refractive index, $\lambda$: wavelength of light, $dn/d\lambda$: primary derivative of refractive index with respect to wavelength of light, and $d^2n/d\lambda^2$: secondary derivative of refractive index with respect to wavelength of light).

SUMMARY OF THE INVENTION

As described above, in the field of optical materials such as diffraction grating lenses, materials having a low refractive index and a small Abbe number are used.

However, as a result of intensive studies, the inventors of the present invention have found that, in the optical material disclosed in JP2011-237491A or JP2011-085869A, a sufficiently small Abbe number has not yet been obtained.

An object of an embodiment of the present invention is to provide a curable composition from which a cured product having a small Abbe number and a low refractive index can be obtained.

Another object of another embodiment of the present invention is to provide a cured product having a small Abbe number and a low refractive index, or a lens unit including the cured product.

Means for achieving the above objects include the following aspects.

<1> A curable composition comprising:
oxide particles that include at least indium and tin, and to which a ligand having a hydrocarbon group and a binding site to the oxide particles is bonded; and
a polymerizable compound,
in which a content of the oxide particles in the composition is 18 mass % or more with respect to a total solid content of the composition.

<2> The curable composition according to <1>, in which the binding site to the oxide particles is a carboxy group, a thiol group, a phosphoric acid group, a phosphine structure, or an amino group.

<3> The curable composition according to <1> or <2>, in which the binding site to the oxide particles is a carboxy group.

<4> The curable composition according to any one of <1> to <3>, in which a total number of carbon atoms of the hydrocarbon group included in the ligand is 12 to 20.

<5> The curable composition according to any one of <1> to <4>, in which a number average particle diameter of the oxide particles is 10 nm to 30 nm.

<6> The curable composition according to any one of <1> to <5>, in which a number average particle diameter of the oxide particles is 15 nm to 25 nm.

<7> The curable composition according to any one of <1> to <6>, in which an indium content I atom % and a tin content S atom % in the oxide particles satisfy Formula A1.

$$0.04 < S/(I+S) < 0.20 \qquad \text{Formula A1}$$

<8> The curable composition according to any one of <1> to <7>, in which an indium content I atom % and a tin content S atom % in the oxide particles satisfy Formula A2.

$$0.05 < S/(I+S) < 0.12 \qquad \text{Formula A2}$$

<9> The curable composition according to any one of <1> to <8>, in which an Abbe number of the curable composition is 10 to 25.

<10> A cured product obtained by curing the curable composition according to any one of <1> to <9>.

<11> A lens unit comprising the cured product according to <10>.

According to the embodiment of the present invention, it is possible to provide a curable composition from which a cured product having a small Abbe number and a low refractive index can be obtained.

In addition, according to another embodiment of the present invention, it is possible to provide a cured product having a small Abbe number and a low refractive index, or a lens unit including the cured product.

DESCRIPTION OF THE PREFERRED EMBODIMENTS

Numerical ranges expressed using "to" in the present specification mean a range including numerical values described before and after "to" as the lower limit and the upper limit.

In addition, in the present specification, "(meth)acryl" represents both or any one of acryl and methacryl, and "(meth)acrylate" represents both or any one of acrylate and methacrylate.

Furthermore, in the present specification, the amount of each component in the composition means the total amount of the plurality of corresponding substances present in the composition unless otherwise specified, in a case where there are a plurality of substances corresponding to each component in the composition.

In the present specification, the term "step" includes not only an independent step but also a step that cannot be clearly distinguished from other steps as long as the intended purpose of the step is achieved.

In the indication of a group (atomic group) in the present specification, the indication not including substitution or unsubstitution includes those having a substituent and also those not having a substituent. For example, an "alkyl group" refers not only to an alkyl group not having a substituent (unsubstituted alkyl group) but also an alkyl group having a substituent (substituted alkyl group).

Furthermore, the chemical structural formula in the present specification may be described as a simplified structural formula in which a hydrogen atom is omitted.

In the present disclosure, "mass %" and "wt %" are synonymous, and "part by mass" and "part by weight" are synonymous.

Furthermore, in the present disclosure, a combination of two or more preferable embodiments is a more preferable embodiment.

Furthermore, unless otherwise specified, the weight-average molecular weight (Mw) and the number average molecular weight (Mn) in the present disclosure are a molecular weight obtained by detection with a solvent THF (tetrahydrofuran) and a differential refractometer by a gel permeation chromatography (GPC) analyzer using columns of TSKgel GMHxL, TSKgel G4000HxL, and TSKgel G2000HxL (all of which are trade names and manufactured by TOSOH CORPORATION), and conversion using polystyrene as a standard substance.

(Curable Composition)

A curable composition according to the present disclosure (hereinafter, simply referred to as the "composition") includes oxide particles that include at least indium and tin, and to which a ligand having a hydrocarbon group and a binding site to the oxide particles is bonded; and a polymerizable compound, in which a content of the oxide particles in the composition is 18 mass % or more with respect to a total solid content of the composition.

The curable composition according to the present disclosure is a composition that is cured by applying external energy, and it is preferably a composition that is cured by heat or light and is more preferably a composition that is cured by light.

The curable composition according to the present disclosure is preferably an ultraviolet curable composition.

As described above, a material having a low refractive index and a small Abbe number is required as an optical material.

An Abbe number is a value calculated by Formula 1.

$$\text{Abbe number } v_d = (n_d - 1)/(n_f - n_c) \quad \text{Formula 1}$$

In Formula 1, $n_d$ is a refractive index for a D line (a wavelength of 587.56 nm), $n_f$ is a refractive index for an F line (a wavelength of 486.1 nm), and $n_c$ is a refractive index for a C line (a wavelength of 656.3 nm).

The C line, D line, and F line are a C line, D line, and F line in the Fraunhofer lines.

Furthermore, JP2011-237491A or JP2011-085869A discloses an optical material using indium tin oxide (ITO) particles to obtain a material having a low refractive index and a small Abbe number.

As a result of intensive studies, the inventors of the present invention have found that, in the optical material disclosed in JP2011-237491A or JP2011-085869A, a sufficiently small Abbe number has not yet been obtained.

It is presumed that this is because, in the optical material disclosed in JP2011-237491A or JP2011-085869A, dispersibility of ITO particles used in the material is insufficient, and as a result, the ITO particles aggregate to each other, surface defects are generated on the surface of the ITO particles, and so on.

Accordingly, the inventors of the present invention have found that a cured product having a small Abbe number and a low refractive index can be obtained by using the curable composition according to the present disclosure.

The reason why the above effect is obtained is not clear, but it is presumed as follows.

Generally, a refractive index of ITO in a bulk state is as high as about 2.0 to 2.2 in a visible light (400 nm to 700 nm) region. However, particulate ITO particles used in the present disclosure exhibit a strong absorption peak in a near infrared region due to a size effect and a high carrier concentration. The presence of this strong absorption causes a significant decrease in refractive index and a large refractive index dispersion in a short wavelength side (that is, visible light) region due to the absorption peak. For this reason, a composition in which the ITO particles are dispersed and a cured product thereof has a low refractive index and a small Abbe number as compared to a composition in which particles having a high refractive index such as titanium oxide are dispersed and a cured product thereof.

In addition, a ligand having a hydrocarbon group and a binding site for oxide particles is bonded to the oxide particles used in the present disclosure. For this reason, the oxide particles are considered to be highly dispersible in the curable composition according to the present disclosure.

Accordingly, it is considered that, because nonuniformity of particle shapes due to the aggregation of particles in a composition and in a cured product thus obtained is inhibited, a peak width of a plasmon resonance peak of the particles becomes narrow, and the plasmon resonance peak easily occurs at a shorter wavelength, and thereby a cured product having a small Abbe number can be obtained.

It is also considered that the surface defects of the oxide particles are easily inhibited by incorporating a ligand on the surface. Thereby, mobility of electrons in the oxide particles is improved, a peak width is likely to become narrow, and absorption intensity of a resonance peak is likely to become stronger. Accordingly, it is considered that a cured product having a smaller Abbe number is easily obtained.

Hereinafter, details of each component contained in the curable composition according to the present disclosure will be described.

<Specific Oxide Particles>

The curable composition according to the present disclosure includes an oxide particle (hereinafter referred to as the "specific oxide particle") that has at least indium and tin, and to which a ligand having a hydrocarbon group and a binding site to the oxide particles is bonded.

[Ligand]

The ligand having a hydrocarbon group and the binding site for the oxide particles is bonded to the specific oxide particle.

Whether the ligand is bonded to the specific oxide particle or not is checked using Fourier transform infrared spectrophotometer (FTIR).

Specifically, by measuring the presence or absence of stretching vibration derived from a hydrocarbon group having a wave number of around 2900 cm$^1$ to 3000 cm$^1$ using FTIR in the specific oxide particle, it is possible to check whether the ligand is bonded to the specific oxide particle or not.

—Hydrocarbon Group—

The hydrocarbon group in the ligand used in the present disclosure is not particularly limited, but it is preferably an alkyl group or an alkenyl group, and is more preferably an alkyl group.

The hydrocarbon group may be linear or may have a branched structure or a ring structure, but it is preferably linear.

In addition, the hydrocarbon group may be substituted by a halogen atom.

Furthermore, a total number of carbon atoms of the hydrocarbon group contained in the ligand is preferably 8 to 40, is more preferably 12 to 20, and is even more preferably 14 to 18.

Furthermore, the ligand may have only one hydrocarbon group, or may have two or more hydrocarbon groups.

A total number of carbon atoms of the hydrocarbon group contained in the ligand refers to a total number of carbon atoms of all hydrocarbon groups in a case where the ligand contains a plurality of hydrocarbon groups.

—Binding Site to Oxide Particles—

The binding site to the oxide particles preferably has a binding site to the oxide particles.

The binding site is not particularly limited as long as it binds to oxide particles containing indium and tin, but it is preferably a carboxy group, a thiol group, a phosphoric acid group, a phosphine structure (P(—R$^P$)$_3$), a phosphine oxide structure (P(=O)(—R$^P$)$_3$), an amino group (—NR$_2$) or an ammonium group, a hydroxyl group, or an onium group; is more preferably a carboxy group, a thiol group, a phosphoric acid group, a phosphine structure, or an amino group from the viewpoint that bonding to oxide particles containing indium is easy and high dispersibility is expected; and is even more preferably a carboxy group particularly from the viewpoint that binding to oxide particles containing indium is easy.

R$^P$'s in the phosphine structure (P(—R$^P$)$_3$) or phosphine oxide structure (P(=O)(—R$^P$)$_3$) each independently represent a substituent, and at least one R is preferably a hydrocarbon group, and all three R$^P$'s are preferably a hydrocarbon group. In a case where R$^P$ is a hydrocarbon group, R$^P$ corresponds to the hydrocarbon group in the above-mentioned ligand.

In addition, the ligand may have only one binding site or may have two or more binding sites, but from the viewpoint of further improving dispersibility, it preferably has only one binding site.

R$^N$'s in an amino group (—NR$^N{}_2$) each independently represent a hydrogen atom or a substituent, and all R$^N$'s are preferably a hydrogen atom.

Furthermore, a binding mode between these binding sites and the oxide particles is not particularly limited, but bonding by a coordinate bond is preferable.

Specific Examples of Ligands

The ligand is not particularly limited, and examples thereof include decanoic acid, lauric acid, myristic acid, palmitic acid, stearic acid, behenic acid, oleic acid, erucic acid, oleylamine, dodecylamine, dodecanethiol, 1-hexadecanethiol, trioctylphosphine oxide, trioctylphosphine, oleyl phosphate, cetrimonium bromide (cetyltrimethylammonium bromide), and the like.

One kind of the ligand may be used alone, or two or more kinds thereof may be used in combination.

From the viewpoint of dispersibility of the specific oxide particles, a content of the ligand is preferably 0.1 mass % to 60 mass %, is more preferably 1.5 mass % to 45 mass %, and is even more preferably 3.0 mass % to 20 mass % with respect to a total mass of the specific oxide particles.

[Characteristics of Specific Oxide Particles]

The specific oxide particles are oxide particles containing indium (In) and tin (Sn).

The specific oxide particles are in a form in which Sn is doped into oxidized In, and are in a form in which the number of free electrons in the particles is higher than that of normal oxidized In. These free electrons cause plasmon resonance with respect to incidence of electromagnetic waves having a specific wavelength, and selective absorption in a specific wavelength range occurs. Such plasmon resonance occurs only in the vicinity of the surface in the bulk state, but generally, in a case where a particle has a size of about the wavelength or less of the electromagnetic wave, the entire particles are in a resonance state and exhibit strong selective wavelength absorption. A plasma frequency $\omega_P$ in the bulk state is expressed by the following equation.

$$\omega_P = \sqrt{\frac{Ne^2}{\varepsilon_0 \varepsilon_\infty m_e^*}}$$

Where, N is a carrier concentration, e is an electron elementary charge, $\varepsilon_0$ is a vacuum electronic dielectric constant, $\varepsilon_\infty$ is an electronic dielectric constant of a semiconductor material when a frequency is infinite, and $m_e$ is an effective mass of electrons in a semiconductor material.

In a case of a particle state, plasmon resonance absorption occurs in a frequency region (that is, on a long wavelength side) that is slightly lower than a plasma frequency in the above-mentioned bulk state.

In a material having such selective absorption, a refractive index shows a steep change at wavelengths around a peak wavelength of the plasmon resonance absorption.

In general, ITO particles have the above-mentioned plasmon resonance absorption in the near-infrared region, but because changes in the refractive index extends to a visible light region, an Abbe number can be reduced by using oxide particles containing indium (In) and tin (Sn).

In a case where such a peak wavelength of plasmon resonance absorption is present in a region (for example, a wavelength of 1000 nm to 2000 nm) close to the visible light region (a wavelength of 400 nm to 700 nm), a curable composition having a smaller Abbe number can be realized.

Accordingly, it is possible to improve performances in a case where the curable composition is used as a diffraction grating lens and to improve a degree of freedom in designing optical elements. In a case where a carrier concentration N is large in the above equation, a plasma frequency can be controlled to be in a region close to the visible light region, and a small Abbe number of the curable composition and a cured product thus obtained can be expected.

For this reason, a case where an indium content I atom % and a tin content S atom % in the specific oxide particles satisfy Formula A1 is preferable because then a high carrier concentration in the specific oxide particles is easily realized, and a plasmon resonance peak is easily controlled to be a short wavelength side.

In addition, it is more preferable to satisfy Formula A2 from the viewpoint that further reduction of an Abbe number can be expected.

$$0.04<S/(I+S)<0.20 \quad \text{Formula A1}$$

$$0.05<S/(I+S)<0.12 \quad \text{Formula A2}$$

An indium content I atom % and a tin content S atom % in the specific oxide particles described above are measured by Inductively Coupled Plasma (ICP) Mass Spectrometry.

A total value of the indium content I atom % and the tin content S atom % in the specific oxide particles is preferably 90 atom % to 100 atom %, is more preferably 95 atom % to 100 atom %, and is even more preferably 98 atom % to 100 atom %.

—Number Average Particle Diameter—

A number average particle diameter of the specific oxide particles is preferably 10 nm to 30 nm, is more preferably 15 nm to 25 nm, and is even more preferably 20 nm to 25 nm.

In a case where a number average particle diameter is 30 nm or less, scattering in the visible light region is less than 1%, and thereby a lens having excellent transmission characteristics is easily obtained as a lens.

Meanwhile, in a case where a number average particle diameter is 10 nm or more, thixotropic properties are hardly generated in the composition, and thereby an increase in viscosity of the composition is easily inhibited. Because dispersibility of the particles is improved by inhibiting the increase in viscosity of the composition, haze and plasmon resonance characteristics of the composition are improved. Thereby, optical characteristics as a lens material are easily improved.

The above-mentioned number average particle diameter is obtained by observing the particles with a transmission electron microscope (TEM), calculating an equivalent circle diameter of at least 100 particles, and calculating an arithmetic average value thereof. In addition, from the viewpoint of controlling a resonance peak to be precipitous, a standard deviation of the number average particle diameter is preferably 5 nm or less, and is more preferably 3 nm or less.

The above-mentioned standard deviation is obtained by observing the particles with a transmission electron microscope (TEM), calculating an equivalent circle diameter of at least 100 particles, and calculating a standard deviation thereof.

—Shell Layer—

In addition, a shell layer made of any material may be formed to impart durability against oxidation or the like to the specific oxide particles.

The shell layer is not particularly limited, but it is preferably the same or similar crystalline material as a core particle because then it reduces surface defects and facilitates realization of high mobility. Furthermore, a multi-shell structure composed of a laminate of a plurality of shell materials may be used.

The shell layer is formed by, for example, adding a shell raw material while heating after synthesizing core particles.

The above-mentioned heating may be performed by maintaining a heating state in formation of the core particles, or the heating may be performed again after the core particles are formed and once cooled.

—Content of Specific Oxide Particles—

A content of the oxide particles in the curable composition according to the present disclosure is 18 mass % or more, is preferably 38 mass % or more, and is even more preferably 43 mass % or more with respect to a total solid content of the composition.

In addition, a content is preferably 80 mass % or less, is more preferably 75 mass % or less, and is even more preferably 70 mass % or less.

Regarding the above-mentioned content, thermal mass spectrometry is performed, and by considering a residual solid component obtained by performing heating to a temperature at which a liquid component can be completely removed (for example, 500° C.) as the above-mentioned oxide particles, a mass content of the oxide particles with respect to the entire curable composition to be measured is calculated.

In a case where the target is a cured product, a weight of the cured product to be measured is measured in advance, and masses of In and Sn detected by ICP analysis are measured. Where, a mass as the ITO component is calculated by assuming that in the composition of the ITO particles, a measured amount of Sn with respect to $In_2O_3$ is substituted by In. From the mass of the ITO component with respect to the mass of the entire cured product, a mass content of the oxide particles is calculated.

—Method for Manufacturing Specific Oxide Particles—

The method for manufacturing the specific oxide particles is not particularly limited, and examples thereof include the following methods.

Indium acetate, tin acetate, and a ligand are heated to about 150° C. to obtain a precursor solution, the precursor solution is added dropwise into an organic solvent heated to about 300° C., and by redispersing the mixture in a solvent after cooling, ITO particles to which the ligand is bonded can be obtained.

Specific examples of methods include a method described in the examples.

<Polymerizable Compound>

The curable composition according to the present disclosure contains a polymerizable compound.

The polymerizable compound is not particularly limited, but it is preferably a radical polymerizable compound, and is more preferably an ethylenically unsaturated compound.

The ethylenically unsaturated compound is, for example, preferably a polyfunctional ethylenically unsaturated compound having two or more ethylenic unsaturated groups, and is more preferably a polyfunctional (meth)acrylate compound having two or more (meth)acryloxy groups, from the viewpoint of easily setting a refractive index after curing the curable composition to about 1.5 to 1.55, which is a suitable value for use in a diffraction grating lens.

Examples of polyfunctional ethylenically unsaturated compounds include 1,4-divinylcyclohexane, 1,4-cyclohexanedimethanol divinyl ether, divinylbenzene, 1,6-divinylnaphthalene, ethoxylated bisphenol A divinyl ether, propoxylated bisphenol A di(meth)acrylate; polyethylene glycol di(meth)acrylate, polypropylene glycol di(meth)acrylate, trimethylolethane tri(meth)acrylate, neopentyl glycol di(meth)acrylate, pentaerythritol tri(meth)acrylate, pentaerythritol tetra(meth)acrylate, dipentaerythritol hexa(meth)acrylate, hexanediol di(meth)acrylate, tricyclodecane dimethanol diacrylate, tri(acryloyloxyethyl)isocyanurate, tris(2-acryloxyethyl)isocyanurate, and the like.

The curable composition according to the present disclosure may contain one kind of a polymerizable compound alone or two or more kinds thereof in combination.

A content of the polymerizable compound in the curable composition according to the present disclosure is preferably 15 mass % to 85 mass %, is more preferably 20 mass % to 70 mass %, and is even more preferably 30 mass % to 60 mass % with respect to a total solid content of the curable composition.

A total solid content in the present disclosure is a total amount of components excluding volatile components such as a solvent in the composition.

<Polymerization Initiator>

The curable composition according to the present disclosure preferably contains a polymerization initiator.

From the viewpoint of making the curable composition according to the present disclosure into an ultraviolet curable composition, it is preferable to incorporate a photopolymerization initiator as a polymerization initiator.

Furthermore, the polymerization initiator may be appropriately selected according to the polymerizable compound contained in the curable composition, but in a case where the polymerizable compound is a radical polymerizable compound, the polymerization initiator is preferably a radical polymerization initiator.

The curable composition according to the present disclosure includes a photoradical polymerization initiator.

As the photoradical polymerization initiator, a photoradical polymerization initiator containing an acylphosphine oxide structure, an α-hydroxyalkylphenone structure, or an α-aminoalkylphenone structure is preferable.

In addition, the photoradical polymerization initiator is not particularly limited in terms of structure, and examples thereof include 2,4,6-trimethylbenzoyldiphenylphosphine oxide, bis(2,4,6-trimethylbenzoyl)phenylphosphine oxide, 2,2-dimethoxy-1,2-diphenylethane-1-one, 1-hydroxycyclohexyl phenyl ketone, 1-hydroxycyclohexyl phenyl ketone, 1-[4-(2-hydroxyethoxy)phenyl]-2-hydroxy-2-methyl-1-propan-1-one, 2-hydroxy-1-{4-[4-(2-hydroxy-2-methyl-propionyl)benzyl]phenyl}-2-methyl-propan-1-one, 2-methyl-1-(4-methylthiophenyl)-2-morpholinopropan-1-one, and the like.

Commercially available products may be used for the photoradical polymerization initiator, and specific examples of commercially available products include IRGACURE series (for example, IRGACURE TPO, IRGACURE 819, IRGACURE 651, IRGACURE 184, IRGACURE 1173, IRGACURE 2959, IRGACURE 127, IRGACURE 907, and the like) manufactured by BASF.

The curable composition according to the present disclosure may contain one kind of photoradical polymerization initiator alone or two or more kinds thereof in combination.

A content of the photoradical polymerization initiator in the curable composition according to the present disclosure is preferably 0.05 mass % to 10 mass %, is more preferably 0.1 mass % to 10 mass %, is even more preferably 0.1 mass % to 5 mass %, and is particularly preferably 0.5 mass % to 3 mass % with respect to a total mass of the polymerizable compound, from the viewpoint of wear resistance after curing and high-temperature stretchability.

<Dispersant>

The curable composition according to the present disclosure may contain a dispersant.

In the present disclosure, a compound that is bonded to oxide particles and corresponds to the above-described ligand is not included in the dispersant.

By incorporating the dispersant, dispersibility of the specific oxide particles is further improved, and as a result, high visible light transmission characteristics and a small Abbe number are easily realized. As the dispersant, a cationic, nonionic, or amphoteric surfactant is effective. Particularly, it is possible to use polyester, ε-caprolactone, polycarboxylate, polyphosphate, hydrostearate, amidosulfonate, polyacrylate, an olefin maleate copolymer, an acrylic-maleate copolymer, alkylamine acetates, organophosphoric acids, alkyl fatty acid salts, fatty acid polyethylene glycol esters, silicones, and fluorines, but in the present disclosure, it is preferable to use at least one basic dispersant selected from the group consisting of ammonia and organic amines. Specific examples thereof include Dispersic series (manufactured by Big Chemie Japan), Solsperse series (manufactured by Zeneca), TAMN series (manufactured by Nikko Chemical), and the like. DISPERBYK-161 (amine-based) and DISPERNYK-111 (phosphoric acid-based) are more preferable from the viewpoint of large absorptivity and steric hindrance and easy dispersibility.

The curable composition according to the present disclosure may contain one kind of dispersant alone or two or more kinds thereof in combination.

A content thereof in the curable composition according to the present disclosure is preferably 1 mass % to 30 mass %, is more preferably 3 mass % to 20 mass %, and is even more preferably 5 mass % to 15 mass % with respect to a total mass of the oxide particles in the curable composition.

<Other Components>

The curable composition according to the present disclosure may contain other components.

Examples of other components include solvents, polymerization inhibitors, surfactants other than the above-mentioned dispersants, plasticizers, sensitizers, and the like. Furthermore, it is preferable not to contain a solvent in order to improve curability and to inhibit non-uniform generation inside a film during curing.

<Characteristics of Curable Composition>

[Abbe Number]

An Abbe number of the curable composition according to the present disclosure is preferably 8 to 30, is more preferably 10 to 25, and is even more preferably 10 to 20.

The Abbe number of the curable composition is measured using a refractometer DR-M2 manufactured by Atago Co., Ltd.

(Refractive Index)

In the curable composition according to the present disclosure, a refractive index nD with respect to light having a wavelength of 589 nm is preferably 1.40 to 1.60 and is more preferably 1.40 to 1.55.

The above refractive index is measured using a refractometer DR-M2 manufactured by Atago Co., Ltd.

[Visible Light Transmittance]

A visible light transmittance (hereinafter simply referred to as a "transmittance") at a wavelength of 405 nm of the curable composition according to the present disclosure is preferably 85% to 100% and is more preferably 90% to 100%.

The visible light transmittance is a value in terms of an optical path length of 10 μm and is measured using a spectrophotometer V-670 manufactured by JASCO Corporation.

<Use Applications of Curable Composition>

The curable composition according to the present disclosure can be preferably used for manufacture of an optical material having a small Abbe number and a low refractive index, and is particularly preferably used for manufacture of a diffraction grating lens, but use applications are not limited thereto.

(Cured Product)

The cured product according to the present disclosure is a cured product obtained by curing the curable composition. A method for curing a curable composition is not particularly limited, and examples thereof include a method in which a curable composition is applied to a substrate, dried as necessary, and then cured by irradiation with ultraviolet light.

<Characteristics of Cured Product>

[Abbe Number]

An Abbe number of the cured product according to the present disclosure may be appropriately designed according to use applications, but it is preferably 10 to 25, and from the viewpoint of use for a diffraction grating lens, it is more preferably 10 to 20.

An Abbe number of the cured product according to the present disclosure is measured using a refractometer DR-M2 manufactured by Atago Co., Ltd.

(Refractive Index)

In the cured product according to the present disclosure, a refractive index with respect to light having a wavelength of 589 nm may be appropriately designed depending on use applications, but it is preferably 1.40 to 1.60 and is more preferably 1.45 to 1.55.

A refractive index of the cured product according to the present disclosure is measured using a refractometer DR-M2 manufactured by Atago Co., Ltd.

[Visible Light Transmittance]

A visible light transmittance at a wavelength of 405 nm of the cured product according to the present disclosure is preferably 85% to 100% and is more preferably 90% to 100%.

The visible light transmittance is a value obtained by measurement using a spectrophotometer V-670 manufactured by JASCO Corporation.

<Use Applications of Cured Product>

The cured product according to the present disclosure can be preferably used as an optical material having a small Abbe number and a low refractive index, and is particularly preferably used for a diffraction grating lens, but use applications are not limited thereto.

(Lens Unit)

A lens unit according to the present disclosure includes the cured product according to the present disclosure.

Examples of the lens unit according to the present disclosure include a lens unit which includes a first diffractive optical element that is the cured product according to the present disclosure; and a second diffractive optical element of which an Abbe number larger than that of the cured product according to the present disclosure and in which one surface is a diffractive surface having a diffractive shape, in which the first diffractive optical element and the second diffractive optical element are laminated diffractive optical elements in which they are disposed such that their diffractive surfaces are opposed to each other and are closed attached to each other.

The second diffractive optical element is not particularly limited, and it can be formed by, for example, curing a known curable composition. As the known curable composition, for example, a curable composition disclosed in JP2009-197217A is used.

An Abbe number of the second diffractive optical element is not particularly limited as long as it is higher than an Abbe number of the first diffractive optical element, and it is preferably, for example, 35 to 60 and is more preferably 40 to 55.

Furthermore, a method for manufacturing a laminated diffractive optical element is not particularly limited, and the laminated diffractive optical element can be manufactured by a known method. For example, a method disclosed in JP2009-197217A is used.

EXAMPLES

The embodiments of the present invention will be described more specifically with reference to the following examples. In the following examples, the materials to be used, amounts and ratios thereof, the details of the treatment and the treatment procedures, and the like may be suitably modified or changed without departing from the scope of the embodiments of the present invention. Accordingly, the scope of the embodiments of the present invention should not be limited by the following specific Examples. Unless otherwise specified, "part," "%," and "wt %" are based on mass.

Examples 1 and 2

<Synthesis of Oleic-Acid-Coordinated ITO Particles>

ITO particles (specific oxide particles) were synthesized as follows.

First, 15 ml of oleic acid, 6.75 mmol of indium acetate, and 0.75 mmol of tin acetate were inserted into a flask and heated at 150° C. in an environment of nitrogen flow, and thereby a precursor solution was obtained (inserted In:Sn=9:1 (molar ratio)).

Subsequently, 13 ml of oleyl alcohol was added to another flask and heated at 290° C. in a nitrogen flow. The precursor solution was dropwise added into the heated oleyl alcohol. Approximately 40 minutes after the start of addition, heating was stopped and the temperature was cooled to room temperature.

To the resulting solution, ethanol was added and centrifuged to settle the particles, and then the supernatant was removed and redispersed in toluene, thereby a toluene dispersion of ITO particles coordinated with oleic acid (an ITO particle dispersion, an ITO particle concentration of about 30 g/L) was obtained.

When the above ITO particles were observed by TEM, a number average particle diameter was 21 nm.

Figure 1:
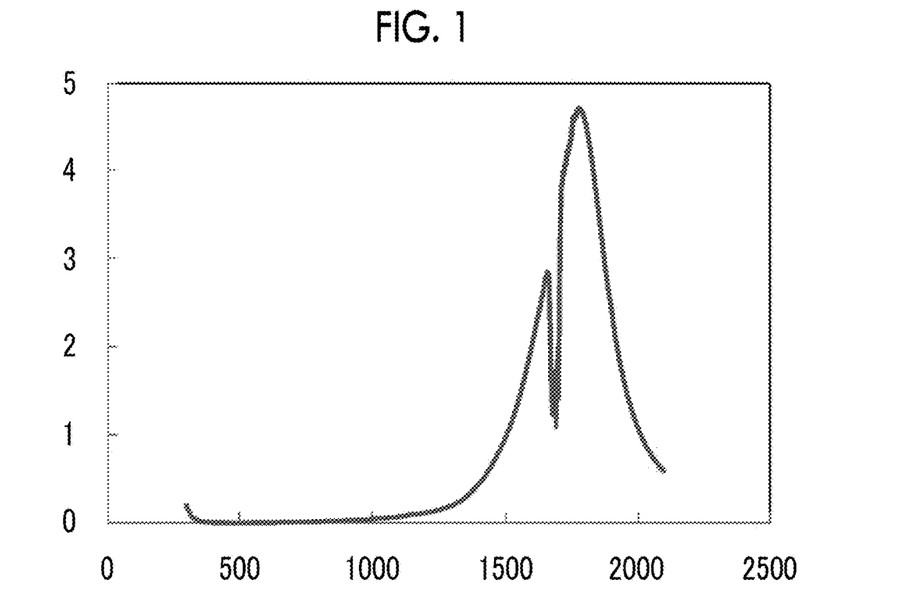
FIG. 1 is a graph showing absorption characteristics of an ITO particle dispersion in Examples.

Furthermore, FIG. 1 shows results of measuring absorption characteristics in a case where the obtained ITO particle dispersion was diluted to 0.1 mass % using a spectrophotometer V-670 manufactured by JASCO Corporation. In FIG. 1, a vertical axis indicates an absorbance and a horizontal axis indicates an absorption wavelength (nm). A dip around 1700 nm is due to noise from the reference measurement.

<Production of Curable Composition>

38 µl of DISPERBYK-106 or DISPERBYK-111 (both manufactured by BYK Additives & Instruments) was added to the above ITO particle dispersion (an ITO particle content of 125 mg) and stirred at 40° C. for 1 hour. Subsequently, 1,6-hexanediol diacrylate was added thereto.

The toluene solvent was removed from the above mixed solution using an evaporator, and thereby the curable composition according to the present disclosure was obtained.

A content of ITO particles in the composition was 27 mass %.

In addition, when S/(I+S), which is to be calculated by an indium content I atom % and a tin content S atom % in the oxide particles, was analyzed by ICP-MS, it was 0.081.

<Evaluation of Absorption Characteristics>

The obtained curable composition was diluted to 0.1 mass % with toluene, and the absorption characteristics of the composition were measured using a spectrophotometer V-670 manufactured by JASCO Corporation using an optical cell having an optical path length of 1 cm.

A transmittance of visible light was calculated by converting the obtained optical characteristics in a case where a content of ITO particles in toluene was 40 mass % and a thickness thereof was 10 μm. Where, the transmittance was evaluated as a transmittance with respect to a wavelength of 405 nm, and evaluation results are shown in Table 1.

Furthermore, an Abbe number and a refractive index (nD) of the composition were measured by the above-mentioned method, and results are shown in Table 1.

In a case of a sample having strong plasmon resonance in a near infrared region, a sample in which the curable composition was diluted to about 0.01 mass % was produced, and its absorption characteristics were measured.

Comparative Example 1

A curable composition was produced in the same method as in Example 1 except that an amount of hexanediol diacrylate was changed such that a content of ITO particles in the curable composition became 15 mass % in the production of the curable composition, and then respective evaluations were performed. Evaluation results are shown in Table 1.

Comparative Examples 2 and 3

2 g of toluene, 0.2 g of DISPERBYK-161 or DISPERBYK-111 (manufactured by BYK Additives & Instruments), and 0.5 g of 100 μm ZrO₂ beads were added with respect to 0.4 g of ITO particles (a particle diameter of 25 to 35 nm, manufactured by Mitsubishi Materials), the mixture was dispersed with a vibrator, and thereby an ITO particle dispersion having no ligand dispersed in toluene was obtained. A curable composition was produced by the same method as in Example 1 except that the ITO dispersion was used, and then respective evaluations were performed. Evaluation results are shown in Table 1.

TABLE 1

|  | Average particle diameter (nm) | Ligand | Dispersant | Particle concentration (wt %) | Visible light transmittance (%) | Abbe number | nD |
|---|---|---|---|---|---|---|---|
| Example 1 | 21 | Oleic acid | BYK-106 | 27 | 90 | 21.2 | 1.495 |
| Example 2 | 21 | Oleic acid | BYK-111 | 27 | 90 | 21.1 | 1.494 |
| Comparative Example 1 | 21 | Oleic acid | BYK-106 | 15 | 91 | 26.7 | 1.496 |
| Comparative Example 2 | 30 | No ligand | BYK-161 | 27 | 80 | 32.1 | 1.482 |
| Comparative Example 3 | 30 | No ligand | BYK-111 | 27 | 81 | 31.8 | 1.481 |

Based on the results shown in Table 1, it was found that in a case where the ITO particles to which the ligand was bonded were contained by an amount of 18 mass % or more, an Abbe number is small, dispersibility is high, and visible light transmission characteristics are exhibited.

Because a refractive index of the curable composition is low, a refractive index of the cured product of the curable composition also has a low value.

In addition, because an Abbe number of the curable composition is small, an Abbe number of the cured product of the curable composition also has a small value.

Furthermore, even in a case where a polymerization initiator is further contained in the curable composition, the visible light transmittance, Abbe number, and refractive index of the curable composition and the cured product are not substantially changed.

In the absence of the ligand, it was found that the visible light transmittance and Abbe number decrease. It is presumed that this is because haze occurs due to influences of secondary agglomeration of particles and surface defects, an absorption intensity decrease due to influences of defects and agglomeration, or a peak width of the plasmon resonance peak increases.

Example 3 to Example 12

In the production of ITO particles used in Example 1, by adjusting an amount of the precursor solution, ITO particles having an average particle diameter changed as shown in Table 2 were produced.

A curable composition was produced by the same method as in Example 1 except that a number average particle diameter (an average particle diameter) and a content were changed as shown in Table 2, and evaluation was performed. Evaluation results are shown in Table 2.

In addition, a viscosity of the composition was measured according to the following evaluation standard, and evaluation results are shown in Table 2.

A: Very favorable
B: Favorable
C: Likely to be cured

TABLE 2

|  | Average particle diameter (nm) | Particle concentration (wt %) | Visible light transmittance (%) | Abbe number | Viscosity of composition | nD |
|---|---|---|---|---|---|---|
| Example 3 | 5.1 | 27 | 87 | 23.2 | Likely to be cured | 1.499 |
| Example 4 | 10.4 | 27 | 92 | 21.8 | Favorable | 1.498 |
| Example 5 | 13.2 | 27 | 91 | 21.5 | Favorable | 1.496 |
| Example 6 | 15.6 | 27 | 90 | 21.4 | Very favorable | 1.496 |
| Example 7 | 21 | 27 | 90 | 21.2 | Very favorable | 1.495 |
| Example 8 | 25.2 | 27 | 89 | 21.2 | Very favorable | 1.495 |
| Example 9 | 30.3 | 27 | 87 | 22.1 | Very favorable | 1.496 |
| Example 10 | 34.6 | 27 | 85 | 22.5 | Very favorable | 1.497 |
| Example 11 | 21 | 40 | 90 | 19 | Very favorable | 1.499 |
| Example 12 | 21 | 46 | 90 | 16.9 | Very favorable | 1.504 |

Based on the results described in Table 2, in a case where an average particle diameter is 10 nm or more, a viscosity of the curable composition becomes low, and fluidity of the composition is excellent. For this reason, it is considered that aggregation and the like of the specific oxide particles are easily inhibited, and thereby excellent moldability is easily obtained.

In addition, in a case where an average particle diameter is 30 nm or less, a visible light transmittance also becomes excellent. It is presumed that this is because light scattering by the particles is inhibited.

Figure 2:
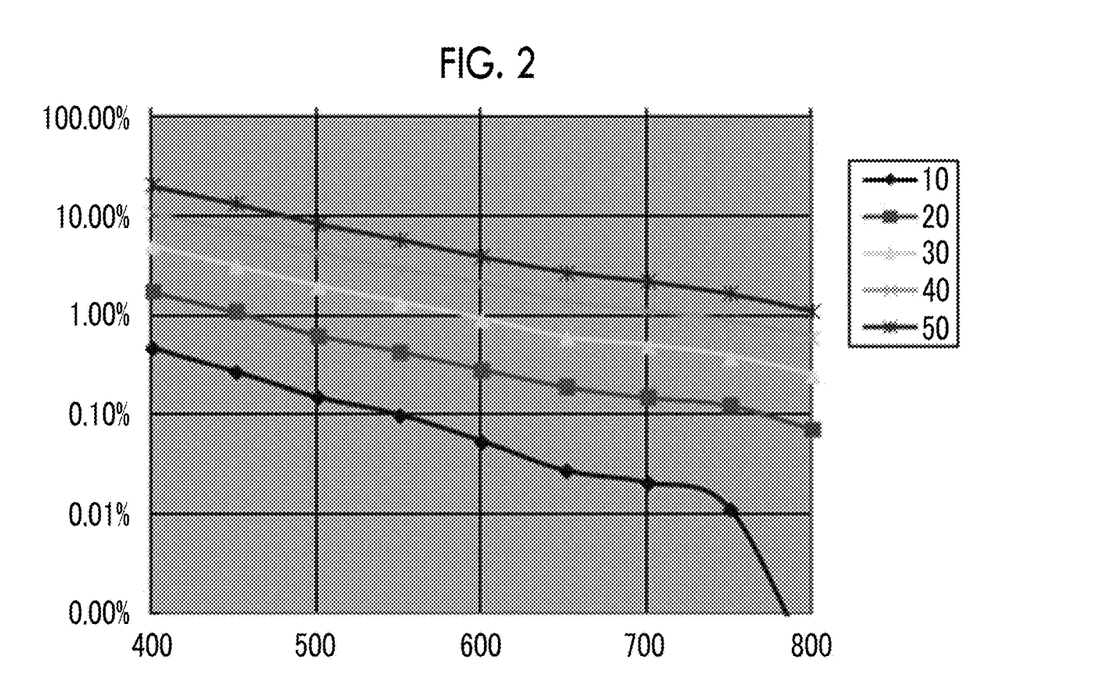
FIG. 2 shows correlation between an average particle diameter of ITO particles and light scattering components by Finite-difference time-domain method (FDTD) calculation.

FIG. 2 shows correlation between an average particle diameter of ITO particles and light scattering components by Finite-difference time-domain method (FDTD) calculation.

A scattering light quantity ratio in the cured product containing ITO particles was obtained by FDTD calculation. In the above calculation, a refractive index of the ITO particles was 2.0, a refractive index of a binder resin was 1.5, a content of the ITO particles was 43 mass %, and a thickness of the cured product was 10 μm.

Numerical values 10, 20, 30, 40, and 50 in FIG. 2 respectively represent average particle diameters (nm) of the ITO particles.

From FIG. 2, it can be seen that in a case where an average particle diameter of the ITO particles is 10 nm to 30 nm, a ratio of scattered light becomes small.

Examples 13 to 19 and Comparative Example 4

In the method for synthesizing the ITO particles of Example 1, by changing an In/Sn ratio in the precursor solution by changing amounts of indium acetate and tin acetate used, ITO particles of which a composition was controlled were obtained. Specifically, amounts of indium acetate and tin acetate were changed such that a value of S/(I+S) calculated from an indium content I atom % and a tin content S atom % in the oxide particles becomes a numerical value shown in Table 3.

A composition was produced in the same manner as in Example 1 except that the produced ITO particles were used, particles having an average particle diameter of 21 nm were used, and an ITO particle concentration in the composition was 46 mass %, and then optical properties were evaluated. Evaluation results are shown in Table 3.

TABLE 3

|  | Sn/(In + Sn) | Visible light transmittance (%) | Abbe number | nD |
|---|---|---|---|---|
| Example 13 | 0.025 | 92 | 21.3 | 1.508 |
| Example 14 | 0.04 | 91 | 19.2 | 1.506 |
| Example 15 | 0.051 | 91 | 17.5 | 1.505 |
| Example 16 | 0.081 | 90 | 16.9 | 1.504 |
| Example 17 | 0.119 | 90 | 17.2 | 1.505 |
| Example 18 | 0.164 | 91 | 18.1 | 1.505 |
| Example 19 | 0.203 | 91 | 19.5 | 1.506 |
| Comparative Example 4 | 0 | 91 | 27.1 | 1.511 |

As shown in Table 3, it can be understood that, by controlling Sn/(In+Sn) in the ITO particles to 0.04 to 0.20 (preferably 0.05 to 0.12), a composition having a smaller Abbe number can be obtained.

Examples 20 to 23

5 g of trioctylphosphine (Example 20), 5 g dodecanethiol (Example 21), 5 g oleylamine (Example 22), or 5 g of oleyl phosphate (Example 23) was added to 5 mL of the ITO particle dispersion (an average particle diameter of 21 nm, a particle solid content of 125 mg) which was obtained in Example 1, and the mixture was heated at 80° C. for about 1 hour to promote ligand exchange.

Thereafter, ethanol was added to the mixed solution and centrifuged to precipitate particles, and then the solution was redispersed in 5 mL of toluene, and thereby an ITO particle dispersion in which the ligand was exchanged was obtained. A curable composition was produced by the same method as in Example 1 except that the ITO particle dispersion liquid in which the ligand was exchanged was used, and a particle concentration was 46 mass %, and then the same evaluation was performed, and its results are shown in Table 4.

A curable composition was produced by the same method as in Example 1 except that the ITO particle dispersion produced in Example 1 was used for data shown as "Experimental Example" in Table 4, and a particle concentration was 46 mass %, and then the same evaluation was performed.

TABLE 4

|  | Ligand | Visible light transmittance (%) | Abbe number | nD |
|---|---|---|---|---|
| Example 20 | Trioctylphosphine | 90 | 17.2 | 1.505 |
| Example 21 | Dodecanethiol | 89 | 17.8 | 1.505 |

TABLE 4-continued

| | Ligand | Visible light transmittance (%) | Abbe number | nD |
|---|---|---|---|---|
| Example 22 | Oleylamine | 88 | 18.2 | 1.506 |
| Example 23 | Oleyl phosphate | 90 | 17 | 1.504 |
| Experimental Example | Oleic acid | 90 | 16.9 | 1.504 |

As shown in Table 4, by using, as a ligand in the ITO particles, a compound in which a binding site to the oxide particles is a carboxy group, a thiol group, a phosphine structure, an amino group, or a phosphoric acid group, a curable composition having a small Abbe number could be obtained.

It is also understood that a composition having a smaller Abbe number can be obtained in a case where a compound having a carboxy group as the binding site to the oxide particles is used.

Examples 24 to 26

5 g of an octanoic acid (Example 24, a hydrocarbon group having 8 carbon atoms (C8)), a lauric acid (Example 25, a hydrocarbon group having 12 carbon atoms (C12)), and a myristic acid (Example 26, a hydrocarbon group having 14 carbon atoms (C14)) were added to 5 mL of the ITO particle dispersion (an average particle diameter of 21 nm, a particle solid content of 125 mg) which was obtained in Example 1, and the mixture was heated at 80° C. for about 1 hour to promote ligand exchange.

Thereafter, ethanol was added to the mixed solution and centrifuged to precipitate particles, and then the solution was redispersed in 5 mL of toluene, and thereby an ITO particle dispersion in which the ligand was exchanged was obtained. A curable composition was produced by the same method as in Example 1 except that the ITO particle dispersion liquid in which the ligand was exchanged was used, and a particle concentration was 46 mass %, and then the same evaluation was performed, and its results are shown in Table 5.

A curable composition was produced by the same method as in Example 1 except that the ITO particle dispersion produced in Example 1 was used for data shown as "Experimental Example" in Table 5, and a particle concentration was 46 mass %, and then the same evaluation was performed.

TABLE 5

| | Ligand | Visible light transmittance (%) | Abbe number | nD |
|---|---|---|---|---|
| Example 24 | Octanoic acid (C8) | 87 | 19.8 | 1.508 |
| Example 25 | Lauric acid (C12) | 89 | 17.7 | 1.506 |
| Example 26 | Myristic acid (C14) | 89 | 17.2 | 1.505 |
| Experimental Example | Oleic acid (C18) | 90 | 16.9 | 1.504 |

As shown in Table 5, it can be seen that, in a case where a total number of carbon atoms of the hydrocarbon groups contained in the ligand is 8 or more, a curable composition having a small Abbe number can be obtained.

In addition, it can be seen that, in a case where a total number of carbon atoms of the hydrocarbon groups contained in the ligand is 12 or more, a curable composition having a smaller Abbe number can be obtained.

Example 27

A curable composition was produced in the same manner as in Example 1 except that 5 mL of the ITO particle dispersion (an average particle diameter of 21 nm, a particle solid content of 125 mg) which was obtained in Example 1 was used, a content of the ITO particles was 46 mass %, and 1 mass % of a polymerization initiator (Irg651, BASF) was added with respect to a total mass of 1,6-hexanediol diacrylate.

Thereafter, irradiation with ultraviolet light was performed (an exposure wavelength: 365 nm, an exposure amount: 1 J/cm$^2$) to cure the composition, and thereby an acrylic resin (a cured product) containing ITO particles was produced. A film thickness of this acrylic resin was approximately 9 μm.

Various optical characteristics of the acrylic resin were as shown in Table 6.

TABLE 6

| | Transmittance (%) | Abbe number | nD |
|---|---|---|---|
| Example 27 | 95 | 18.8 | 1.531 |

As described in the results of Examples 1 to 26, a composition in an uncured state had a low refractive index of about 1.5.

In addition, as shown in Example 27 (Table 6), also in the cured product obtained by curing, a refractive index fluctuation due to curing was about 0.03, and it can be seen that a low refractive index is realized.

Based on the above examples, it can be seen that the curable composition according to the present disclosure can provide a cured product having a small Abbe number and a low refractive index.

Furthermore, according to the curable composition in the examples according to the present disclosure, it can be seen that a cured product having excellent visible light transmission characteristics can be obtained.

<Production of Lens Unit>

A curable composition was produced in the same manner as in Example 1 except that 5 mL of the ITO particle dispersion (an average particle diameter of 21 nm, a particle solid content of 125 mg) which was obtained in Example 1 was used, a content of the ITO particles was 46 mass %, and 1 mass % of a polymerization initiator (Irg651, BASF) was added with respect to a total mass of 1,6-hexanediol diacrylate.

The obtained curable composition was added dropwise on a mold having a concavo-convex shape with a height D of 8.9 μm, and irradiated with ultraviolet light (an exposure wavelength of 365 nm, and an exposure amount of 1 J/cm$^2$), and thereby a low-refractive-index-small-Abbe-number resin (the cured product according to the present disclosure) which has an uneven surface was obtained.

Figure 3:
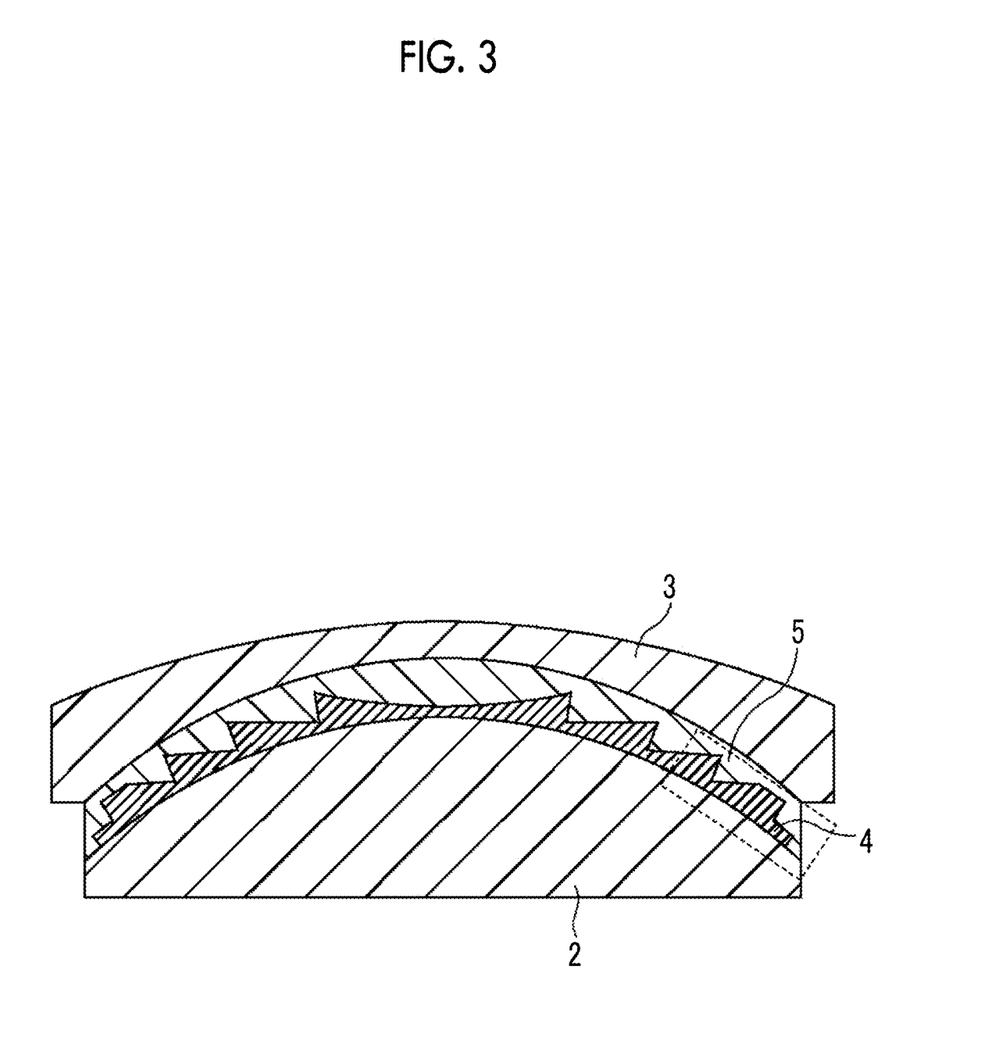
FIG. 3 is a schematic view of a mold used in the examples for producing a diffraction grating lens.

A specific shape of the low-refractive-index-small-Abbe-number resin is a concentric pattern represented by a lattice layer 4 shown in FIG. 3, and it is a shape having a periodic wavelength of about 1 mm and a wave number of 25. The mold size was 50 mmφ. FIG. 3 is a schematic view of a laminated lens unit in which an adhesion layer 5 and the lattice layer 4 are laminated between a first substrate 2 and a second substrate 3. Specifically, a diffractive resin layer was formed on the first substrate 2 (made of glass) using a mold, thereafter, an adhesion resin layer solution was applied to the concavo-convex portion to paste the second substrate 3 (made of glass), and UV curing was performed thereon, and thereby a diffraction grating lens sandwiched between the first substrate 2 and the second substrate 3 was produced.

Meanwhile, commercially available $ZrO_2$ particles (manufactured by Sakai Chemical Industry Co., Ltd., an average particle diameter of 5 nm) were dispersed in a mixed solution of dicyclopentenyloxyethyl acrylate:ε-caprolactone-modified tris-(2-acryloxyethyl)isocyanurate=9:1 (a mass ratio) such that a $ZrO_2$ component was 45 mass %. Furthermore, 1 mass % of Irg651 was added with respect to a total mass of dicyclopentenyloxyethyl acrylate and ε-caprolactone modified tris-(2-acryloxyethyl)isocyanurate, and thereby a curable composition containing $ZrO_2$ was obtained.

The $ZrO_2$-containing curable composition was added dropwise on the low-refractive-index-small-Abbe-number resin, and then irradiated again with ultraviolet light (an exposure wavelength of 365 nm, an exposure amount of 1 $J/cm^2$), and thereby a lens unit (a diffraction grating lens) formed by bonding of the low-refractive-index-small-Abbe-number resin and a high-refractive-index-high-Abbe-number resin was obtained.

The characteristics of the diffraction grating lens were as shown in Table 7.

nD and vD indicate a refractive index nD and an Abbe number vD of each layer at a wavelength of 589 nm, and diffraction efficiency indicates diffraction efficiency at each wavelength measured by the following method. The diffraction efficiency was measured by a method disclosed in JP2016-061796A. That is, a measurement light of wavelengths of 589, 486, and 656 nm was incident in a diameter of about 2 mm on an outer periphery part having a lattice shape, an intensity of the primary diffracted light emitted from the element was detected, and an average diffraction efficiency was measured.

TABLE 7

|  | ITO layer | $ZrO_2$ layer |  |
|---|---|---|---|
| nD | 1.531 | 1.598 |  |
| vD | 18.8 | 47.2 |  |
|  | Diffraction efficiency (%) | | |
| Height of grating | 589 nm | 486 nm | 656 nm |
| 8.9 μm | 99.9 | 99.8 | 99.8 |

Based on the results shown in Table 7, it could be understood that, by using the cured product (the low-refractive-index-small-Abbe-number resin) of the curable composition according to the present disclosure, a diffraction grating lens exhibiting excellent diffraction efficiency over the entire visible light region could be obtained.

The disclosure of Japanese Patent Application No. 2017-170538 filed on Sep. 5, 2017 is incorporated herein by reference in its entirety.

All documents, patent applications, and technical standards described in the present specification are incorporated herein by reference to the same extent as the case where incorporation of individual documents, patent applications, and technical standards by reference is specifically and individually described.

What is claimed is:

1. A curable composition comprising:
   oxide particles that include at least indium and tin, and to which a ligand having a hydrocarbon group and a binding site to the oxide particles is bonded; and
   a polymerizable compound,
   wherein a content of the oxide particles in the composition is 43 mass % or more with respect to a total solid content of the composition, and
   the binding site to the oxide particles is a carboxy group, a thiol group, a phosphoric acid group, a phosphine structure, or an amino group.

2. The curable composition according to claim 1, wherein the binding site to the oxide particles is a carboxy group.

3. The curable composition according to claim 1, wherein a total number of carbon atoms of the hydrocarbon group included in the ligand is 12 to 20.

4. The curable composition according to claim 1, wherein a number average particle diameter of the oxide particles is 10 nm to 30 nm.

5. The curable composition according to claim 1, wherein a number average particle diameter of the oxide particles is 15 nm to 25 nm.

6. The curable composition according to claim 1, wherein an indium content I atom % and a tin content S atom % in the oxide particles satisfy Formula A1, $$0.04 < S/(I+S) < 0.20 \qquad \text{Formula A1.}$$

7. The curable composition according to claim 1, wherein an indium content I atom % and a tin content S atom % in the oxide particles satisfy Formula A2, $$0.05 < S/(I+S) < 0.12 \qquad \text{Formula A2.}$$

8. The curable composition according to claim 1, wherein an Abbe number of the curable composition is 10 to 25.

9. A cured product obtained by curing the curable composition according to claim 1.

10. A lens unit comprising the cured product according to claim 9.

* * * * *